US006829963B2

United States Patent
Liao (10) Patent No.: US 6,829,963 B2
(45) Date of Patent: Dec. 14, 2004

(54) HANDLEBAR SHIFTER DEVICE FOR OPERATING BICYCLE DERAILLEUR SYSTEM

(75) Inventor: Chiu Lung Liao, Taichung (TW)

(73) Assignee: Yung Sung Lin, Taichung (TW)

( * ) Notice: Subject to any disclaimer, the term of this patent is extended or adjusted under 35 U.S.C. 154(b) by 130 days.

(21) Appl. No.: 10/233,707

(22) Filed: Sep. 3, 2002

(65) Prior Publication Data

US 2004/0040401 A1 Mar. 4, 2004

(51) Int. Cl.[7] .......................... B62K 23/04; B62M 25/04
(52) U.S. Cl. ..................................... 74/502.2; 74/501.6
(58) Field of Search ................................ 74/489, 502.2, 74/501.6, 527

(56) References Cited

U.S. PATENT DOCUMENTS

| | | | | | |
|---|---|---|---|---|---|
| 5,241,877 | A | * | 9/1993 | Chen | 74/489 |
| 6,021,688 | A | * | 2/2000 | Chang | 74/502.2 |
| 6,209,413 | B1 | * | 4/2001 | Chang | 74/502.2 |
| 6,343,524 | B1 | * | 2/2002 | Lien | 74/502.2 |
| 6,494,112 | B2 | * | 12/2002 | Chen | 74/501.6 |
| 6,532,890 | B2 | * | 3/2003 | Chen | 116/28.1 |
| 2002/0000136 | A1 | * | 1/2002 | Feng et al. | 74/502.2 |
| 2002/0152830 | A1 | * | 10/2002 | Chang | 74/502.2 |
| 2003/0221506 | A1 | * | 12/2003 | Wesling et al. | 74/501.6 |

* cited by examiner

Primary Examiner—William C. Joyce
(74) Attorney, Agent, or Firm—Alan D. Kamrath; Nikolai & Mersereau, P.A.

(57) ABSTRACT

A handlebar shifter device for operating bicycle derailleur system includes a fixed piece connected to a bicycle handlebar and a recess defined in the end surface of the fixed piece for receiving a resilient member therein. A rotatable member is rotatably mounted to a tube of the fixed piece and an annular flange extends from an end surface of the rotatable member. A cable retaining hole is defined in the fixed piece for receiving a derailleur cable therein and a free end of the cable is fixed to the rotatably member. Two blocks extend from the rotatable member and a plate is mounted on the annular flange. Two protrusions extend from an outer periphery of the plate and respectively contacting two blocks on the rotatable member. A plurality of notches are defined in an outer periphery of one of the protrusions and an index peak of the resilient member is engaged with one of the notches.

2 Claims, 9 Drawing Sheets

HANDLEBAR SHIFTER DEVICE FOR OPERATING BICYCLE DERAILLEUR SYSTEM

FIELD OF THE INVENTION

The present invention relates to a handlebar shifter for operating bicycle derailleur system. A plate is connected to the rotatable member of the shifter device and has a plurality of notches so as to be engaged with the resilient member. Both of the plate and the resilient member are made of metal.

BACKGROUND OF THE INVENTION

Figure 6:
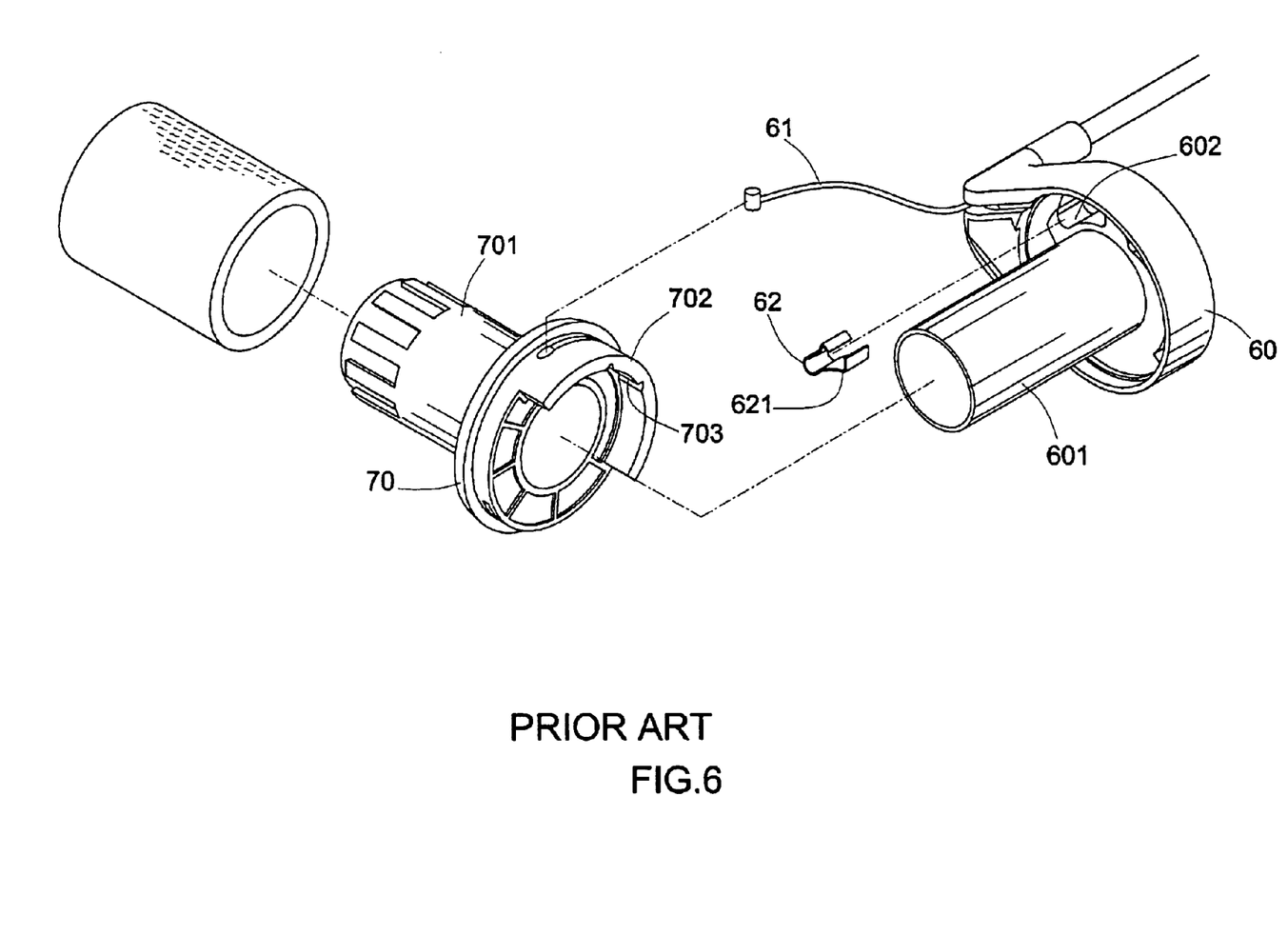
FIG. 6 is an exploded view to show a conventional handlebar shifter.
Figure 7:
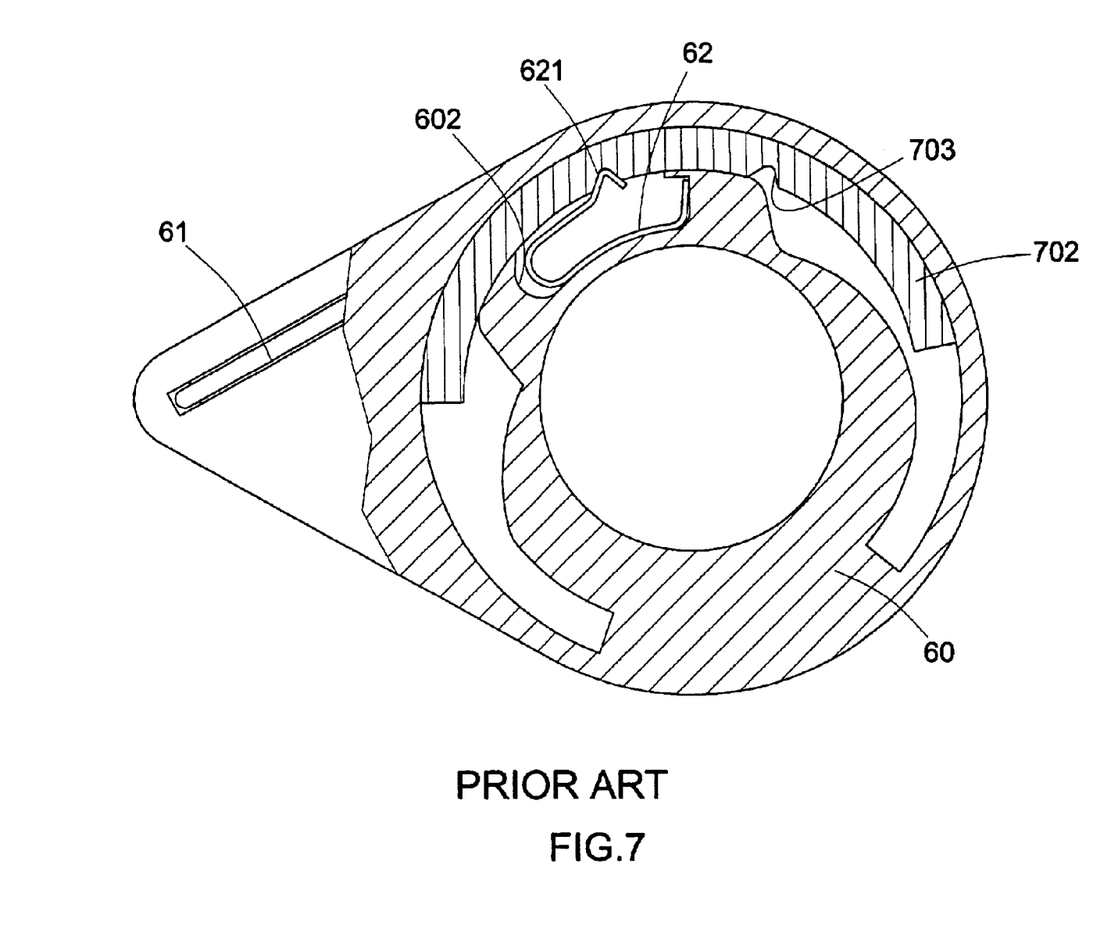
FIG. 7 is a cross sectional view to show the conventional handlebar shifter.
Figure 8:
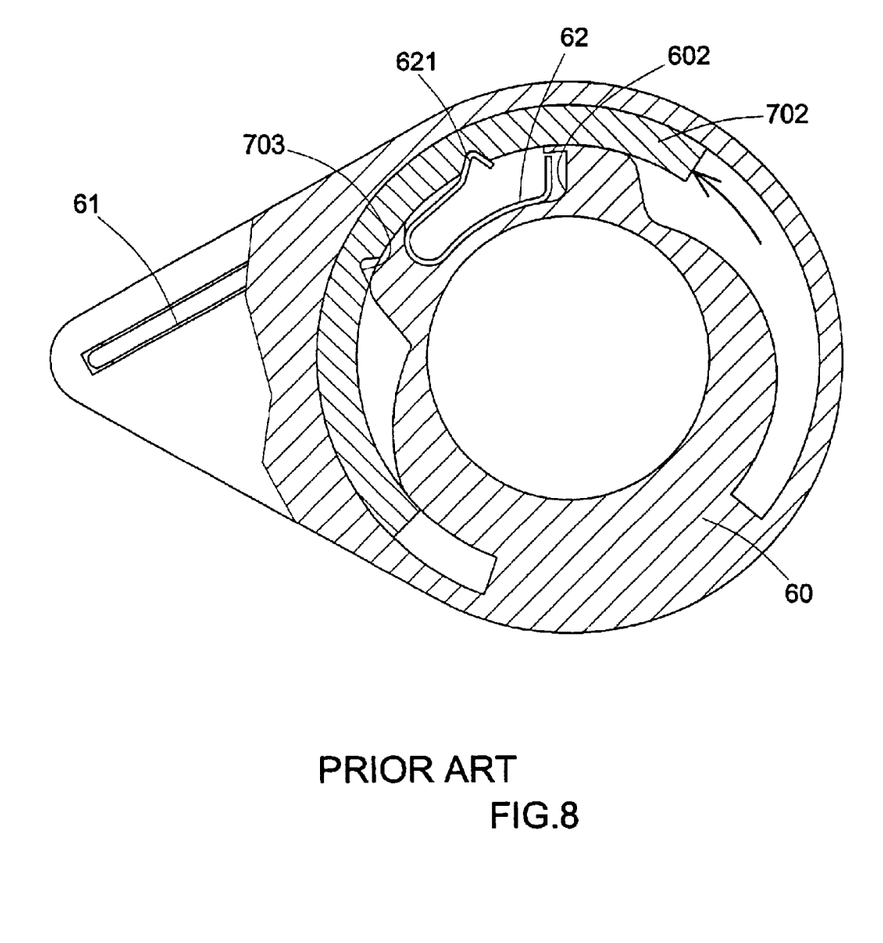
FIG. 8 is a cross sectional view to show that the rotatable member of the conventional handlebar shifter is to be rotated an angle.
Figure 9:
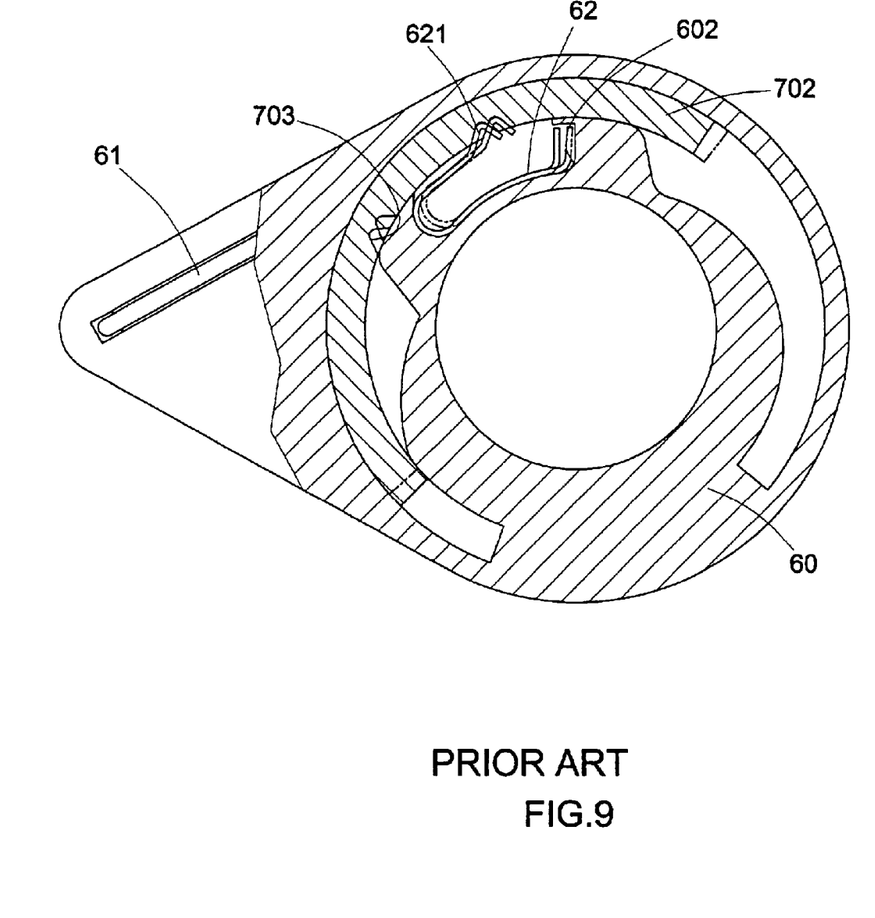
FIG. 9 is a cross sectional view to show the index peak of the resilient member is shifted to another notch in the curve plate on the rotatable member.

A conventional handlebar shifter device for operating bicycle derailleur system is shown in FIGS. 6 and 7 and generally includes a fixed piece 60 fixedly connected to the handlebar of a bicycle and a tube 601 extends from an end surface of the fixed piece 60. A recess 602 is defined in the end surface of the fixed piece 60 so as to receive a resilient member 62 therein which has an index peak 621. A rotatable member 70 is rotatably mounted to the tube 601 and includes a tubular portion 701 on which a grasp of the handlebar is mounted. A curve plate 702 extends from an end surface of the rotatable member 70 and a slot defined in an outer surface of the curve plate 702. A derailleur cable 61 has one end connected to the derailleur system (not shown) and the other end is fixed in the slot. A plurality of notches 703 are defined in an inner periphery of the curve plate 702 so that the index peak 621 of the resilient member 62 is engaged with one of them. When rotating the rotatable member 70, the derailleur cable 61 is pulled or loosened and the position of the notches 703 are rotated to allow the peak 621 to be engaged with one notch 703. By this way, the derailleur cable 61 is operated and set in position. Nevertheless, the curve plate 702 is made of plastic material and the resilient member 62 is made of metal, the plastic made curve plate 702 is worn out by the metal made resilient member 62 so that the index peak 621 of the resilient member 62 cannot well engaged with the notches 703 such that the movement of the derailleur cable 61 is not precisely operated and the chain of the derailleur system become dull.

The present invention intends to provide a handlebar shifter device that has a metal plate co-rotatably connected to the rotatable member and the index peak of the resilient member is engaged with the notches of the plate.

SUMMARY OF THE INVENTION

In accordance with one aspect of the present invention, there is provided a handlebar shifter device for operating bicycle derailleur system and the device comprises a fixed piece connected to a bicycle handlebar and a tube extends from an end surface of the fixed piece so that a rotatable member is rotatably mounted to the tube. A recess is defined in the end surface of the fixed piece and a resilient member is received in the recess. The resilient member has an index peak. A cable retaining hole is defined in the fixed piece for receiving a derailleur cable therein.

The rotatable member has an annular flange extending from an end surface thereof and two blocks extend from the second end surface of the rotatable member. One of the blocks has a slot for receiving an end piece on the derailleur cable.

A plate has a hole for being mounted on the annular flange two protrusions extend from an outer periphery of the plate and respectively contact the two blocks on the rotatable member. A plurality of notches are defined in an outer periphery of one of the protrusions and the index peak of the resilient member is engaged with one of the notches.

The primary object of the present invention is to provide a handlebar shifter that has a metal plate located between the fixed piece and the rotatable member so that the resilient member is engaged with the plate and the plate is durable to precisely position the index peak of the resilient member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
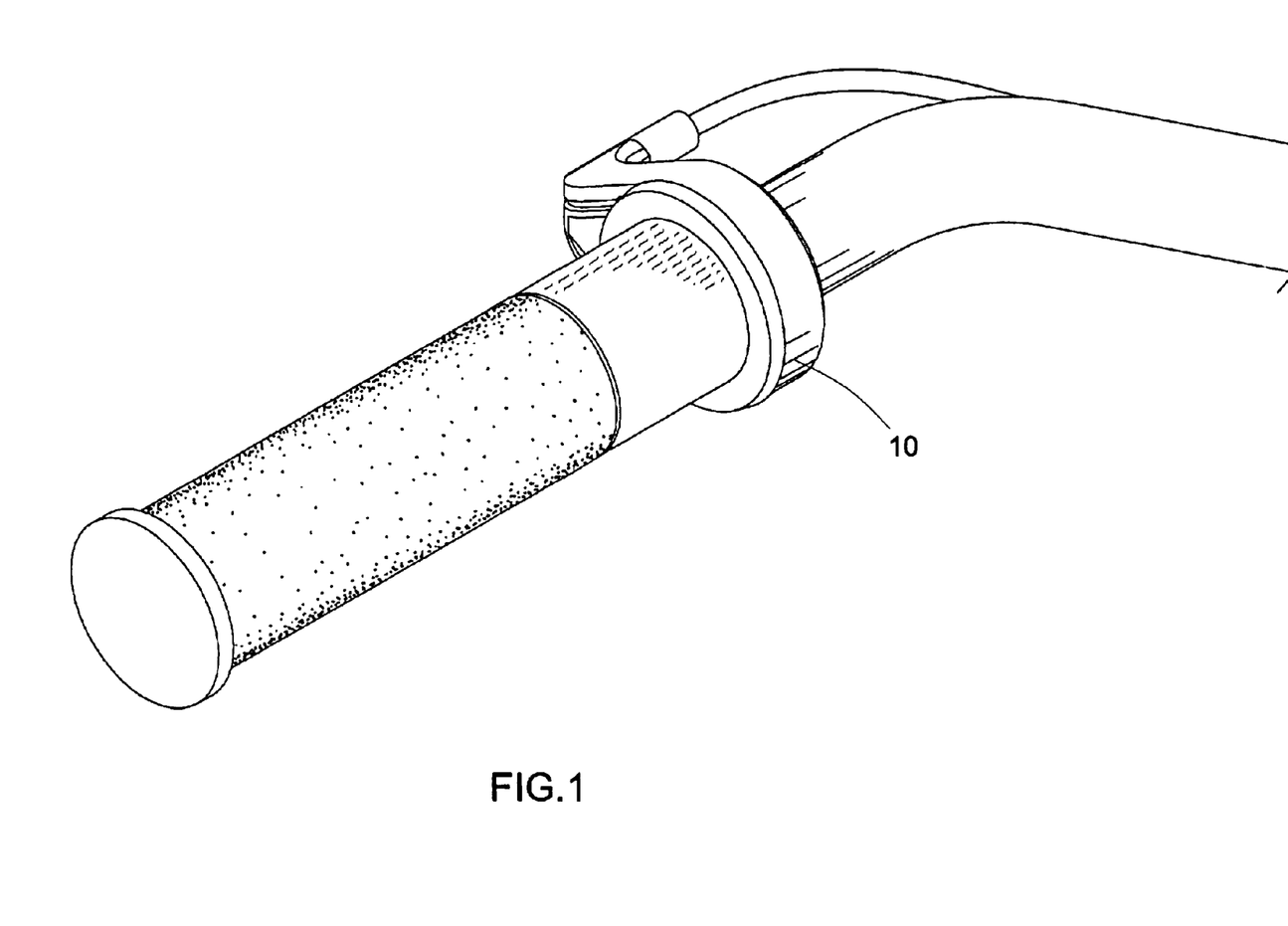
FIG. 1 is a perspective view to show the handlebar shifter of the present invention.
Figure 2:
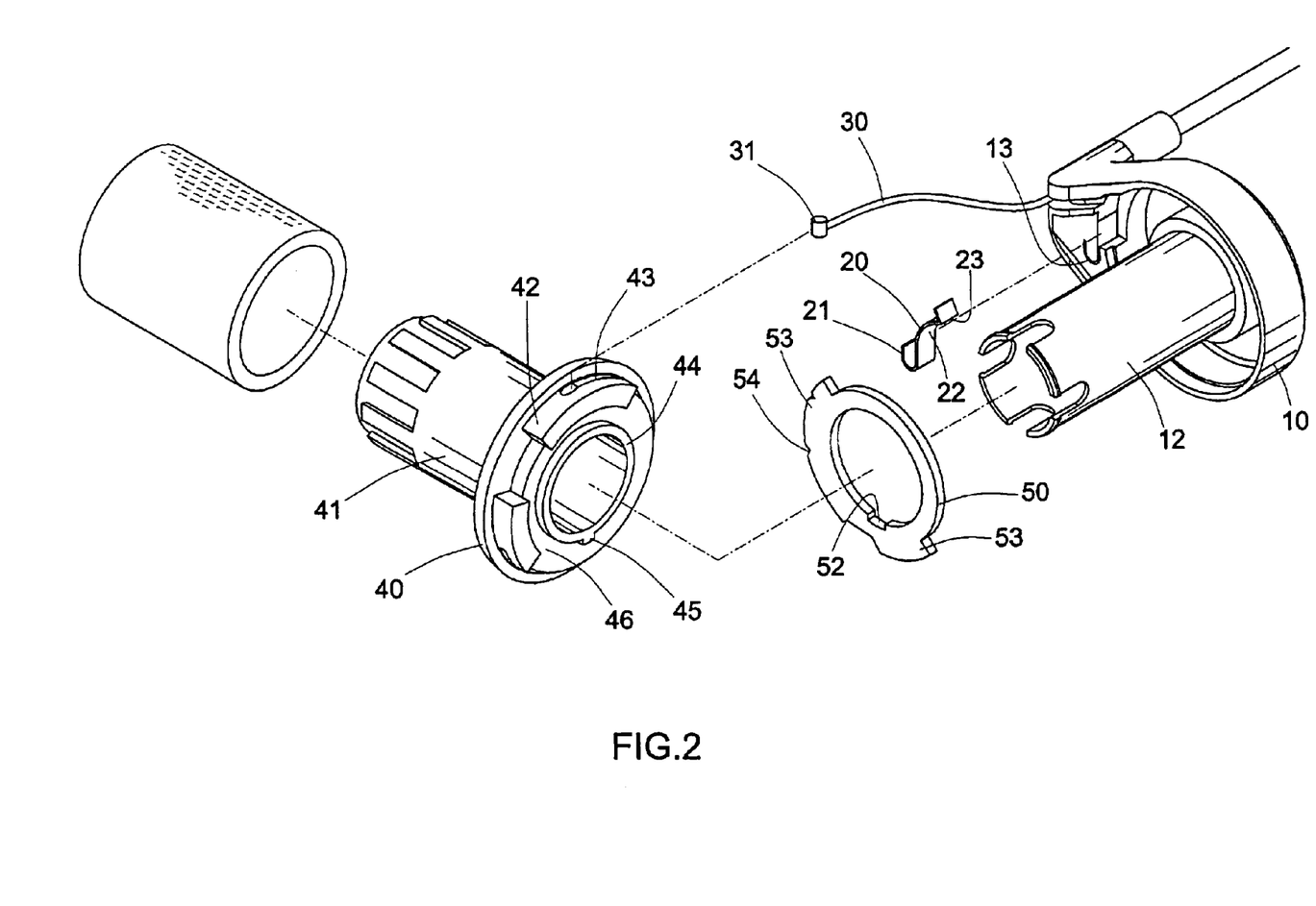
FIG. 2 is an exploded view to show the handlebar shifter of the present invention.
Figure 3:
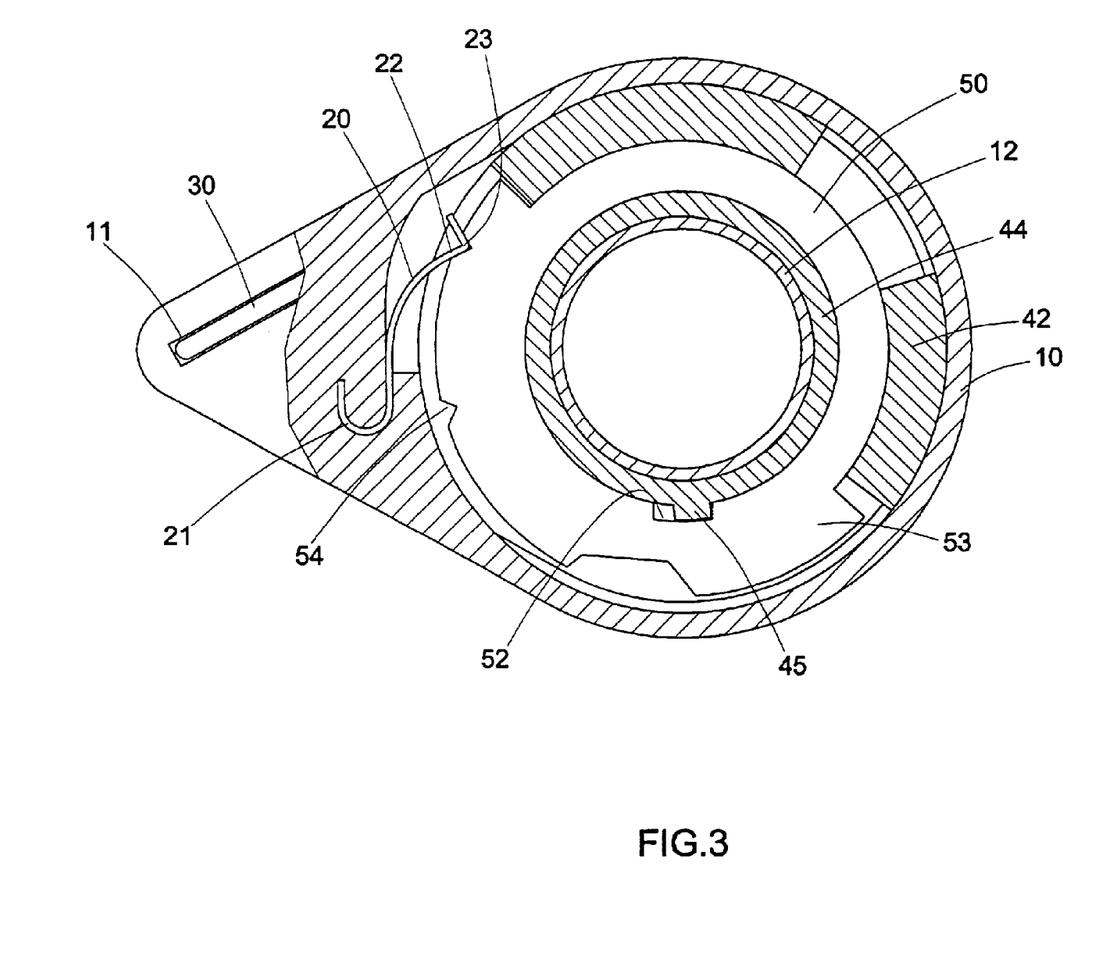
FIG. 3 is a cross sectional view to show the handlebar shifter of the present invention.

Referring to FIGS. 1 to 3, the handlebar shifter device for operating bicycle derailleur system of the present invention comprises a fixed piece 10 connected to a bicycle handlebar and a tube 12 extends from an end surface of the fixed piece. A recess is defined in the end surface of the fixed piece 10 and a resilient member is received in the recess. The resilient member 20 has an end securely engaged with the recess and an operation section 22 on the other end which has an index peak 23. A cable retaining hole 11 is defined in the fixed piece 10 for receiving a derailleur cable 30 therein.

A rotatable member 40 has a tubular portion 41 extending from a first end surface thereof and a passage is defined through the rotatable member 40 and communicates with an interior of the tubular portion 41. An annular flange 44 extends from a second end surface 46 of the rotatable member 40 and two blocks 42 extend from the second end surface 46 of the rotatable member 40. One of the blocks 42 has a slot 43 for receiving an end piece 31 on the derailleur cable 30.

A plate 50 made of metal material has a hole defined in a center thereof and an engaging notch 52 is defined in an inner periphery of the hole in the center of the plate 50. The plate 50 is mounted on the annular flange 44 which has a lug 45 extending from an outer periphery of the annular flange 44 and the lug 45 is engaged with the engaging notch 52.

The width of the engaging notch 52 is slightly larger than the lug 45. Two protrusions 53 extend from an outer periphery of the plate 50 and respectively located beside the two blocks 42 on the rotatable member 40. A plurality of notches 54 are defined in an outer periphery of one of the protrusions 53 and the index peak 23 is engaged with one of the notches 54. The notches 54 in the outer periphery of the plate 50 are V-shaped notches.

Figure 4:
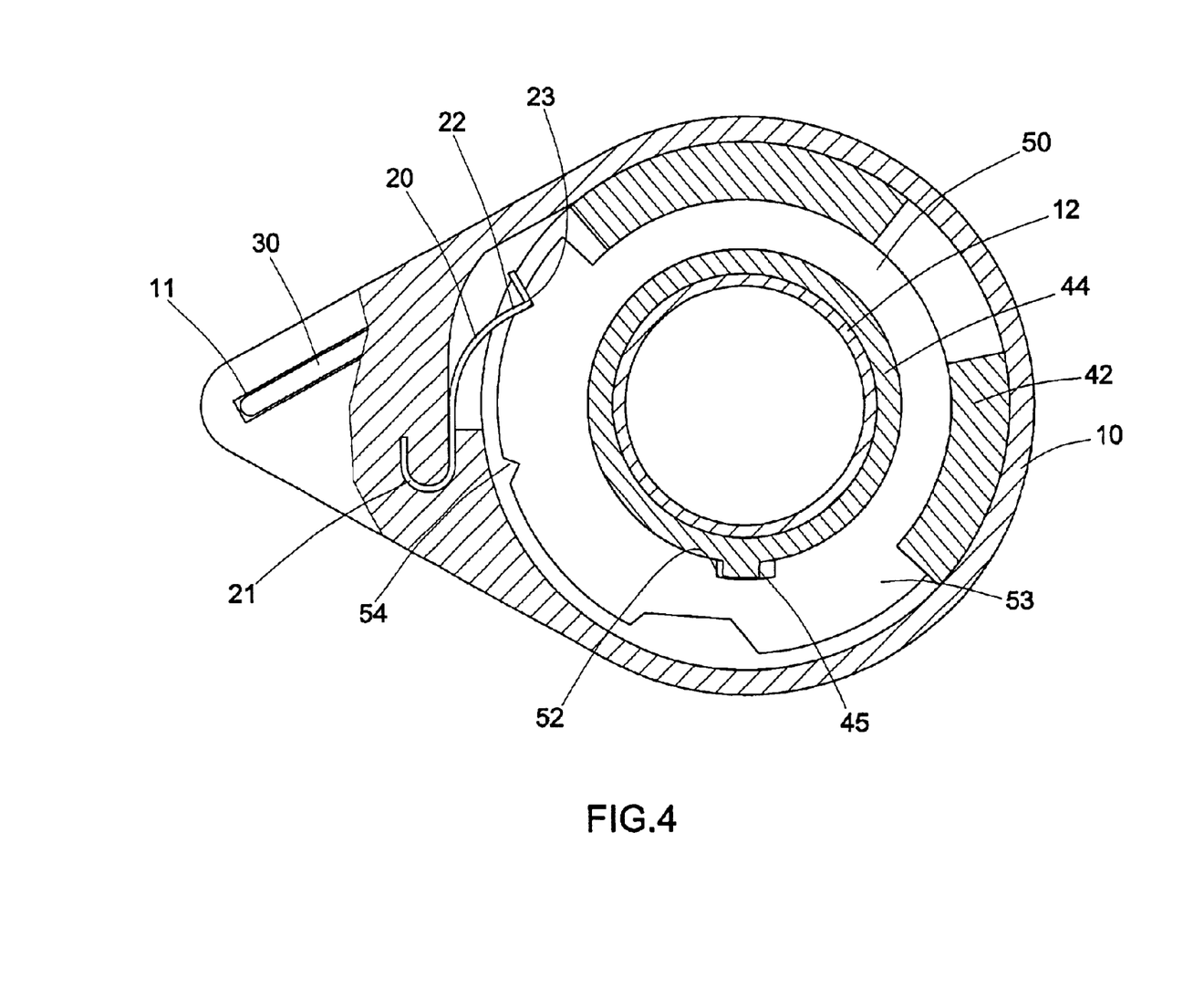
FIG. 4 is a cross sectional view to show that the rotatable member is rotated an angle.
Figure 5:
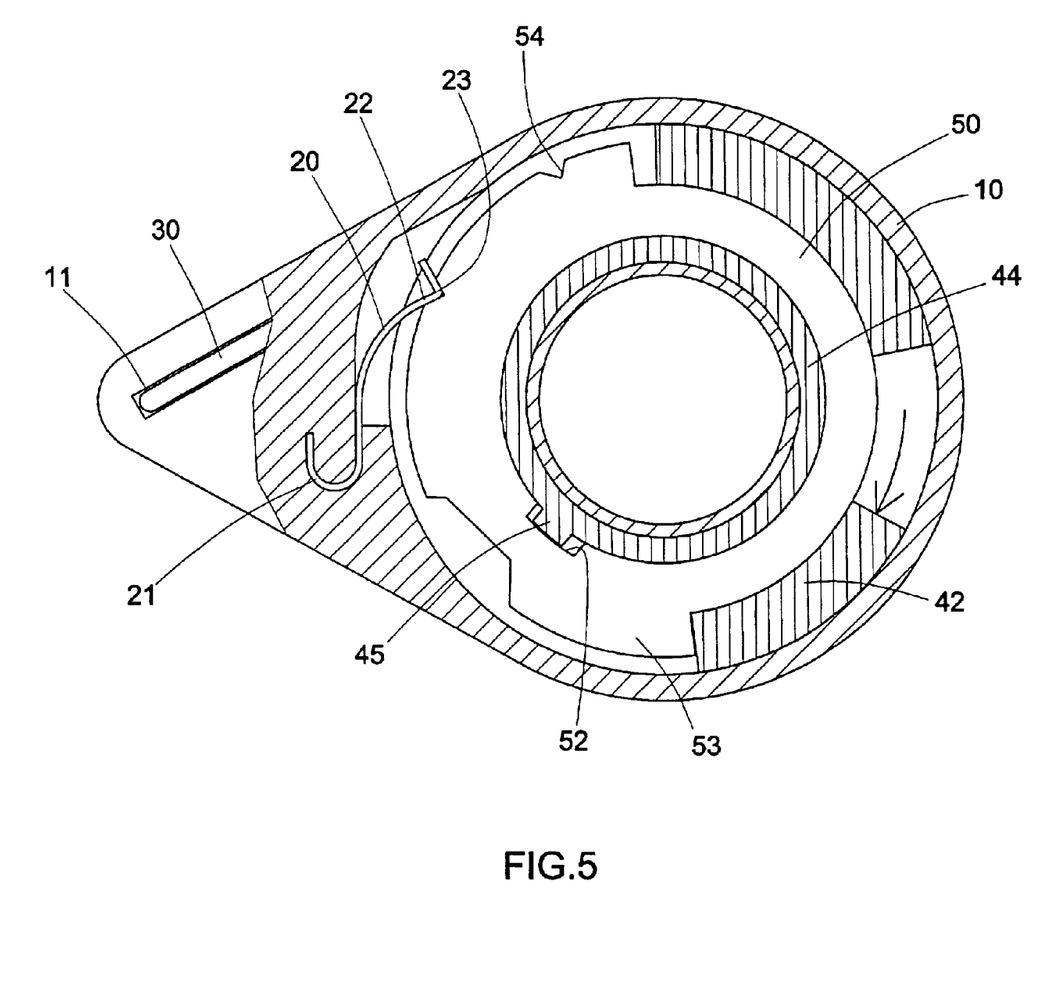
FIG. 5 is a cross sectional view to show the index peak of the resilient member of the conventional handlebar shifter is shifted to another notch in the plate on the rotatable member.

Referring to FIGS. 4 and 5, when rotating the rotatable member 40 slightly, the two blocks 42 are rotated to contact the two protrusions 53. When the rotatable member 40 is continuously rotated, the plate 50 is rotated with the rotatable member 40 and the index peak 23 are shifted to another notch 54. The derailleur cable 30 is then pulled and positioned precisely.

The plate 50 and the resilient member 20 are both made of metal material so that the notches 54 will not be worn out and can last for a long period of time.

While we have shown and described the embodiment in accordance with the present invention, it should be clear to those skilled in the art that further embodiments may be made without departing from the scope of the present invention.

What is claimed is:

1. A handlebar shifter device for operating bicycle deraillecur system, comprising:

a fixed piece adapted to be connected to a bicycle handlebar and a tube extending from an end surface of the fixed piece, a recess defined in the end surface of the fixed piece and a resilient member received in the recess, the resilient member having an index peak, a cable retaining hole defined in the fixed piece for being adapted to receive a derailleur cable therein;

a rotatable member having a tubular portion extending from a first end surface thereof and a passage defined through the rotatable member and communicating with an interior of the tubular portion, an annular flange extending from a second end surface of the rotatable member and two blocks extending from the second end surface of the rotatable member, one of the blocks having a slot for being adapted to receive an end piece on the derailleur cable, a plate having a hole defined in a center thereof and mounted on the annular flange, two protrusions extending from an outer periphery of the plate and respectively contacting the two blocks on the rotatable member, a plurality of notches defined in an outer periphery of one of the protrusions and the index peak engaged with one of the notches; and a lug extending from an outer periphery of the annular flange and an engaging notch defined in an inner periphery of the hole in the center of the plate, the lug engaged with the engaging notch.

2. The device as claimed in claim 1, wherein the notches in the outer periphery of the plate are V-shaped notches.

\* \* \* \* \*